Patented Jan. 26, 1954

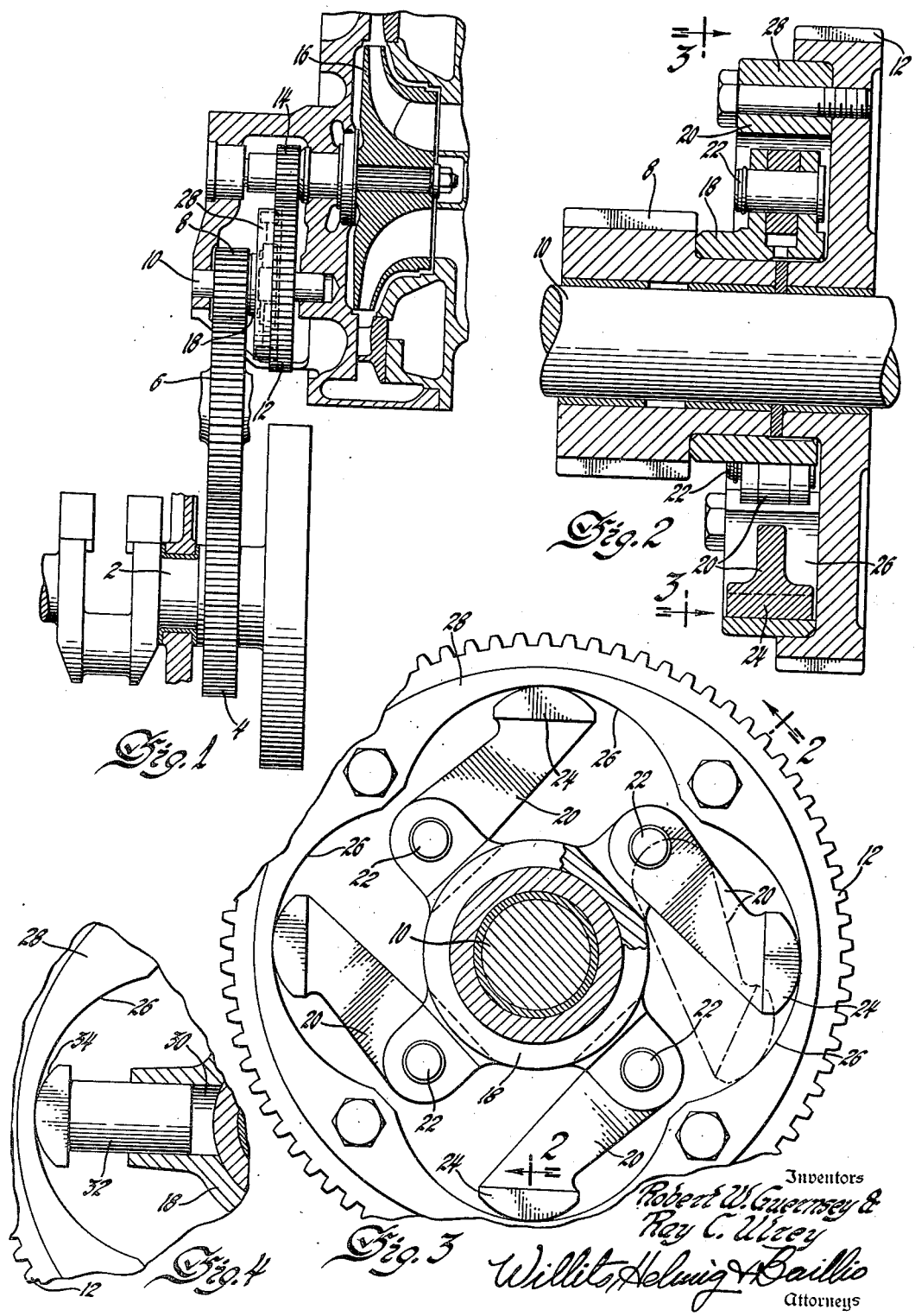

2,667,049

UNITED STATES PATENT OFFICE 2,667,049

TORSIONAL VIBRATION ISOLATING COUPLING

Robert W. Guernsey, Detroit, and Ray C. Ulrey, Livonia, Mich., assignors to General Motors Corporation, Detroit, Mich., a corporation of Delaware Application February 2, 1950, Serial No. 142,046

3 Claims. (Cl. 64—19)

The present invention relates to torsional vibration absorbing couplings adapted to drive rotatable members and relates more particularly to such couplings using speed responsive frictional elements.

The elimination and/or minimizing of the effect of torsional vibration has long been a difficult problem with multiple cylinder high speed engines. This problem is made more acute when the element which is subject to torsional vibration is used to drive a member having inertia characteristics whereby it acts as a seismic mass to resist this vibration. Many of the prior attempts to isolate torsional vibration have utilized frictional elements having a constant torque capacity. It is quite desirable that torsional vibration isolating elements have torque-carrying characteristics which allow the isolation of the torsional vibration but permit the transmission of the full torque capacity of the driving element.

It is therefore an object of the present invention to provide a torsional vibration absorbing coupling which allows relative movement between the coupled elements for low phase angle difference but increasingly resists relative movement as the phase angle increases.

It is a further object of the present invention to provide a commercial torsional vibration isolating coupling in which the torque-carrying capacity is a function of phase angle between the coupled members.

It is a further object of the present invention to provide a torsional oscillation isolating coupling whose torque-carrying capacity is a squared function of the angular velocity of the members being coupled and a predetermined function of the phase angle between these members.

It is a further object of the present invention to provide a torsional oscillation isolating coupling which is economical to produce and simple in operation.

It is another object of the present invention to provide a friction coupling in which the torque-carrying capacity is a function of speed and phase angle of the coupled members.

Other objects of this invention will become apparent upon reading the specification and inspection of the drawing and will be particularly pointed out in the claims.

Figure 1 is a general arrangement cross sectional view showing the present invention used in a supercharger drive.

Figure 2 is a longitudinal cross sectional view of one modification of the present invention.

Figure 3 is a transverse partial cross sectional view of one modification of the invention.

Figure 4 is a partial transverse view of a second modification of the present invention.

Referring now more particularly to Figure 1, 2 represents a rotating element which is subject to torsional vibration and particularly represents a crankshaft of a multi-cylinder internal combustion engine. The shaft 2 has attached thereto a spur gear 4 which is subject to torsional vibration together with the adjacent portion of the shaft 2. The small spur gear 8 is driven at high angular velocity by the gear 4 through an intermediate idler gear 6. The gear 8 is rotatably mounted on a fixed shaft 10. The gear 8 is coupled to the gear 12 by means of the coupling which is the subject of the present invention and will be described more particularly in connection with Figures 2, 3 and 4. The spur gear 12 drives the supercharger blower rotor 16 through a gear 14 which is rigidly mounted on a common shaft with the rotor 16.

Referring now more particularly to Figures 2 and 3, the gear 8 has rigidly attached thereto a collar member 18 with weighted arms 20 pivotally attached thereto by means of pivots 22. The weighted arms 20 have convex shoes 24 which engage the concave portions 26 of the drum 28 which drum is rigidly attached to the gear 12. It may thus be seen that the torque-carrying capacity of the coupling depends upon the effective mass of the pivoted members 20, the speed of rotation of this system and on the position of the shoes 24 in the concave surface 26.

Referring more particularly to the second modification of the present invention shown in Figure 4, the collar 18 has radial cylindrical portions 30 in which weighted pistons 32 may reciprocate. The pistons 32 carry at their outer extremity thereof convex shoes 34 which engage the concave surfaces 26 of the drum 28 which drum is rigidly attached to the gear 12.

It may thus be seen that in either modification of the present invention, the torque-carrying capacity of the coupling depends upon its speed of rotation, the mass of the weighted members which is effective to exert pressure on the surface 26 and upon the position on the concave surface at which this force is exerted. Any desired damping may be obtained by choosing surface material for 24 and 26 which has the proper coefficient of friction. Thus it will be seen that as the collar 18 is caused to oscillate due to the torsional vibration of the shaft 2, the connection through the engaging surfaces 26 and 24 or 34 will tend to isolate the torsional vibration allowing the member 18 to oscillate through a small amplitude of oscillation while driving the gear 12 and the associated blower 16 at a substantially uniform angular velocity.

It is to be understood also that although the invention has been described with specific reference to a particular embodiment thereof, it is not to be so limited, since changes and alterations therein may be made which are within the full intended scope of this invention as defined by the appended claims.

We claim:

1. A flexible coupling for rotatable members including: a driving member, a driven member, one of said members having an internal surface including a series of concave friction surfaces whose centers of radii of curvature lie between the center of rotation of said member and said surface, said other member being formed to provide a plurality of peripherally spaced elements projecting radially therefrom, a plurality of arms pivotally connected at one end to said elements, said pivots lying outside the center of radii of said members, said arms having enlarged weighted portions rigidly formed thereon remote from said pivots, said portions being provided with convex friction surfaces of smaller radii of curvature than said concave surfaces and capable of frictionally engaging said concave surfaces to permit the transmission of driving torque therebetween, the frictional forces between said convex and said concave surfaces being of such magnitude as to cause torsional damping, said arms being movable about said pivots to positions abutting said other member intermediate their respective pivots and enlarged portions, the enlarged portions of said arms being adapted to engage with said concave surfaces in said abutting positions to rigidly transmit torque between said members.

2. In a torsional vibration absorbing coupling which includes a driving member, a driven member concentrically disposed with respect to said driving member, a plurality of concave surfaces formed internally of said driven member, said surfaces being equi-distantly spaced from the axis of rotation of said members, and a plurality of arms pivotally supported at one end upon the periphery of said driving member, said arms having enlarged weighted portions formed at the non-pivoted end thereof, the enlarged portion of each of said arms being adapted to coact with one of said concave surfaces to drivingly engage said driven member so as to normally permit a limited relative oscillation between said members, each of said enlarged arm portions being provided with a convex surface which slidingly engages the corresponding concave surface on said driven member whereby the frictional contact between said concave and said convex surfaces dampens the oscillation between said driving and driven members, said arms being movable about said pivots to positions abutting said driving member intermediate their respective pivots and enlarged portions, the convex surfaces of said arms being adapted to non-slidingly engage said concave surfaces in said abutting position to rigidly transmit torque between said members.

3. In a torsional vibration absorbing coupling which includes a driving member, a driven member concentrically disposed with respect to said driving member, a plurality of concave surfaces circumferentially formed on one of said members, said surfaces being equi-distantly spaced from the axis of rotation of said members, and a plurality of arms pivotally supported at one end upon the other of said members, said arms having enlarged weighted portions formed at the non-pivoted end thereof, the enlarged portion of each of said arms being adapted to coact with one of said concave surfaces to drivingly engage said driven member so as to permit a limited relative oscillation between said members, each of said enlarged arm portions being provided with a convex surface which slidingly engages the corresponding concave surface on said other member whereby the frictional contact between said concave and said convex surfaces dampens the oscillation between said driving and driven members, said arms being movable about said pivots to positions abutting said other member intermediate their respective pivots and enlarged portions, the convex surfaces of said arms being adapted to non-slidingly engage said concave surfaces in said abutting positions to rigidly transmit torque between said members.

ROBERT W. GUERNSEY.
RAY C. ULREY.

References Cited in the file of this patent

UNITED STATES PATENTS

| Number | Name | Date |
|---|---|---|
| 2,116,192 | Draminsky | May 3, 1938 |
| 2,144,089 | Stageberg | Jan. 17, 1939 |
| 2,146,717 | Berger | Feb. 14, 1939 |

FOREIGN PATENTS

| Number | Country | Date |
|---|---|---|
| 226,736 | Germany | 1910 |